US012120406B2

(12) United States Patent
Oyaizu et al.

(10) Patent No.: US 12,120,406 B2
(45) Date of Patent: Oct. 15, 2024

(54) INFRARED INFORMATION DISPLAY APPARATUS, INFRARED INFORMATION DISPLAY METHOD, LEARNING DATA GENERATION APPARATUS, AND LEARNING SYSTEM

(71) Applicant: SONY GROUP CORPORATION, Tokyo (JP)

(72) Inventors: Hideki Oyaizu, Tokyo (JP); Ilya Reshetouski, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 84 days.

(21) Appl. No.: 17/997,828

(22) PCT Filed: May 12, 2021

(86) PCT No.: PCT/JP2021/018006
§ 371 (c)(1),
(2) Date: Nov. 3, 2022

(87) PCT Pub. No.: WO2021/235285
PCT Pub. Date: Nov. 25, 2021

(65) Prior Publication Data
US 2023/0224560 A1 Jul. 13, 2023

(30) Foreign Application Priority Data
May 19, 2020 (JP) .................................. 2020-087191

(51) Int. Cl.
*H04N 23/23* (2023.01)
*G01J 5/53* (2022.01)
(Continued)

(52) U.S. Cl.
CPC ................ *H04N 23/23* (2023.01); *G01J 5/53* (2022.01); *G01J 5/54* (2013.01); *G01J 2005/0077* (2013.01)

(58) Field of Classification Search
CPC .... H04N 23/23; G01J 5/53; G01J 5/54; G01J 2005/0077
(Continued)

(56) References Cited

U.S. PATENT DOCUMENTS

| 4,172,383 A | * | 10/1979 | Iuchi | ......................... G01J 5/52 |
| | | | | 374/126 |
| 4,349,843 A | * | 9/1982 | Laakmann | ............. G02B 26/12 |
| | | | | 250/236 |

(Continued)

FOREIGN PATENT DOCUMENTS

| CN | 101943609 A | 1/2011 |
| CN | 107124600 A | 9/2017 |

(Continued)

OTHER PUBLICATIONS

International Search Report and Written Opinion of PCT Application No. PCT/JP2021/018006, issued on Aug. 3, 2021, 08 pages of ISRWO.

(Continued)

*Primary Examiner* — Matthew David Kim
(74) *Attorney, Agent, or Firm* — CHIP LAW GROUP

(57) ABSTRACT

An infrared information display apparatus according to the present disclosure includes a first black-body furnace; a second black-body furnace that has a temperature different from a temperature of the first black-body furnace; a drive control unit configured to perform drive switching control of reflecting a temperature corresponding to input temperature information of a far-infrared image by switching radiation light reflected by a reflecting mirror from radiation light of (Continued)

the first black-body furnace to radiation light of the second black-body furnace based on the temperature information; and a reflecting section that has a plurality of two-dimensionally disposed reflecting mirrors corresponding to each pixel of the far-infrared image and of which a direction is changed by the drive switching control.

7 Claims, 5 Drawing Sheets

(51) Int. Cl.
  *G01J 5/54* (2006.01)
  *G01J 5/00* (2022.01)
(58) Field of Classification Search
  USPC .......................................................... 348/164
  See application file for complete search history.

(56) References Cited

U.S. PATENT DOCUMENTS

| | | | | |
|---|---|---|---|---|
| 4,867,574 | A | * | 9/1989 | Jenkofsky ............. G01J 5/0806 374/128 |
| 5,017,018 | A | * | 5/1991 | Luchi ...................... G01J 5/025 346/33 TP |
| 5,785,426 | A | * | 7/1998 | Woskov .................... G01J 5/53 374/E11.003 |
| 2007/0103742 | A1 | * | 5/2007 | Ernandes ............. H04N 25/671 348/E5.081 |
| 2018/0044243 | A1 | * | 2/2018 | Citti ...................... C04B 35/185 |
| 2018/0058921 | A1 | * | 3/2018 | Zimmerman ......... G01J 5/0806 |
| 2021/0396588 | A1 | * | 12/2021 | Chiesi ....................... G01J 5/06 |
| 2022/0018717 | A1 | * | 1/2022 | Kemmochi ............. G01J 5/025 |
| 2022/0086370 | A1 | * | 3/2022 | Kuybeda ............. A61B 5/0077 |

FOREIGN PATENT DOCUMENTS

| | | |
|---|---|---|
| JP | 2001-215620 A | 8/2001 |
| JP | 5340725 B2 | 11/2013 |

OTHER PUBLICATIONS

Dong, et al., "Image Super-Resolution Using Deep Convolutional Networks", IEEE, Transactions on Pattern Analysis and Machine Intelligence, vol. 38, No. 2, Jun. 1, 2015, 14 pages.

Jones, et al., "Characterization measurements of the wideband infrared scene projector resistor array", Targets and Backgrounds: Characterization and Representation II, International Society for Optics and Photonics, vol. 2742, Jun. 17, 1996, pp. 25-37.

Dudley, et al., "Emerging Digital Micromirror Device (DMD) Applications", Society of Photo-Optical Instrumentation Engineers (SPIE), International Society for Optics and Photonics, vol. 4985, Jan. 20, 2003, 12 pages.

Khan, et al., "Towards Photorealistic Reconstruction of Highly Multiplexed Lensless Images", IEEE/CVF International Conference on Computer Vision, Oct. 27-Nov. 2, 2019, pp. 7860-7869.

* cited by examiner

# INFRARED INFORMATION DISPLAY APPARATUS, INFRARED INFORMATION DISPLAY METHOD, LEARNING DATA GENERATION APPARATUS, AND LEARNING SYSTEM

CROSS REFERENCE TO RELATED APPLICATIONS

This application is a U.S. National Phase of International Patent Application No. PCT/JP2021/018006 filed on May 12, 2021, which claims priority benefit of Japanese Patent Application No. JP 2020-087191 filed in the Japan Patent Office on May 19, 2020. Each of the above-referenced applications is hereby incorporated herein by reference in its entirety.

FIELD

The present disclosure relates to an infrared information display apparatus, an infrared information display method, a learning data generation apparatus, and a learning system.

BACKGROUND

A technique for forming a high-quality image from a low-quality image photographed by a camera has been achieved (for example, Non Patent Literature 1). For example, a method for generating a high-resolution image from a low-resolution image related to a visible light image using convolutional neural networks (CNN) is disclosed. In such a method, computer graphics (CG) are displayed on a display and photographed by a low-resolution camera, and machine learning is performed by using a pair of a photographed image and an original CG as learning data, thereby forming a network that reproduces a high-resolution image.

It is desired to apply such learning related to a visible light image to learning related to an infrared image. However, in a case of a far-infrared camera, since a display or the like that converts luminance information of an image into temperature information and presents the temperature information is required, it is not easy to apply the same method as that of visible light to the far-infrared camera. For example, there is disclosed a display technique that presents two-dimensional temperature information by two-dimensionally disposing resistors, passing a current through each resistor, and controlling a calorific value for each resistor by current control (for example, Non Patent Literature 2). However, in such a method, it takes time to stabilize the temperature of the resistance. Therefore, it is not suitable for generating a large amount of learning data, and it is also necessary to correct a temperature error due to a difference in characteristics between resistors.

For example, in Non Patent Literature 1, a high-resolution image is estimated from a low-resolution visible light image, but this low-resolution image does not accurately represent deterioration due to a camera, and a low-resolution image by general image processing is used. However, a deterioration image may not be generated by simple image processing. Therefore, there is disclosed a technique for achieving high resolution of a visible-light lensless camera image by presenting an image on a liquid crystal display (LCD), photographing the image with the visible-light lensless camera, and generating learning data (for example, Non Patent Literature 4). In a case of the lensless camera, since an acquired image is completely different from a normal image, it is necessary to degrade a reconstructed image in order to generate a deterioration image, but this does not necessarily accurately represent degradation due to the camera. Therefore, as in the method of Non Patent Literature 4, it is necessary to use an actual lensless camera, and the cost of generating learning data is high. In addition, there is a need for a display capable of displaying a far-infrared image at high speed and high resolution even for a far-infrared lensless camera.

On the other hand, as a technique that can be used for high resolution of the far-infrared image, for example, a technique related to a display in which a plurality of rods with obliquely tips are disposed two-dimensionally and rotation angles thereof can be individually controlled is disclosed (for example, Patent Literature 2). Cut surfaces of the tips of these rods are mirror shaped, and by rotating about a central axis, it is possible to reflect different portions of a radiation source of a non-black-body furnace of which a temperature spectral distribution is configured in an arc shape in a central axis direction. As a result, in a far-infrared region, the temperature to be presented in the central axis direction according to the rotation angle can be changed, and this rod can be rotationally controlled at a high speed, so that temperature information can be presented at a high speed.

In addition, a method using a digital micromirror device (DMD) in which a plurality of oblique reflecting mirrors are disposed two-dimensionally and the reflecting mirrors are controlled to control a light beam (for example, Non Patent Literature 3), and a method of reflecting infrared light from a black-body furnace using the DMD to present a temperature for each pixel using one reflecting mirror as one pixel are disclosed (for example, Patent Literature 1).

CITATION LIST

Patent Literature

Patent Literature 1: JP 2001-215620 A
Patent Literature 2: Japanese Patent No. 5340725

Non Patent Literature

Non Patent Literature 1: Dong, Chao, et al. "Image super-resolution using deep convolutional networks." IEEE transactions on pattern analysis and machine intelligence 38.2 (2015): 295-307.
Non Patent Literature 2: Jones, Lawrence E., Eric M. Olson, and George C. Goldsmith II. "Characterization measurements of the wideband infrared scene projector resistor array." Targets and Backgrounds: Characterization and Representation II. Vol. 2742. International Society for Optics and Photonics, 1996.
Non Patent Literature 3: Dudley, Dana, Walter M. Duncan, and John Slaughter. "Emerging digital micromirror device (DMD) applications." MOEMS display and imaging systems. Vol. 4985. International Society for Optics and Photonics, 2003.
Non Patent Literature 4: Khan, Salman S., et al. "Towards Photorealistic Reconstruction of Highly Multiplexed Lensless Images." Proceedings of the IEEE International Conference on Computer Vision. 2019.

SUMMARY

Technical Problem

For example, according to the technique of Patent Literature 1, the temperature is presented for each pixel by reflecting infrared light from one black-body furnace by the DMD in a specific environment.

However, the technique of Patent Literature 1 does not consider an influence of environmental temperature and disturbance. Therefore, in the technique of Patent Literature 1, it is difficult to accurately present (display) the far-infrared image in consideration of the influence of environmental temperature and disturbance, and there is a problem that the accuracy of learning related to the infrared image decreases. In addition, in the technique of Patent Literature 2, it is difficult to downsize a structure for rotating a rod for analog control, and in a case of far-infrared rays, it is difficult to create an arc-shaped structure that changes at an accurate temperature, and it is difficult to improve temperature accuracy. Therefore, the technique of Patent Literature 2 has a problem that the accuracy of learning related to an infrared image is reduced. Therefore, it is desired to be able to suppress a decrease in an accuracy of learning related to the infrared image.

Therefore, the present disclosure proposes an infrared information display apparatus, an infrared information display method, a learning data generation apparatus, and a learning system capable of suppressing a decrease in an accuracy of learning related to an infrared image.

Solution to Problem

According to the present disclosure, an infrared information display apparatus includes a first black-body furnace; a second black-body furnace that has a temperature different from a temperature of the first black-body furnace; a drive control unit configured to perform drive switching control of reflecting a temperature corresponding to input temperature information of a far-infrared image by switching radiation light reflected by a reflecting mirror from radiation light of the first black-body furnace to radiation light of the second black-body furnace based on the temperature information; and a reflecting section that has a plurality of two-dimensionally disposed reflecting mirrors corresponding to each pixel of the far-infrared image and of which a direction is changed by the drive switching control.

DESCRIPTION OF EMBODIMENTS

Figure 1:
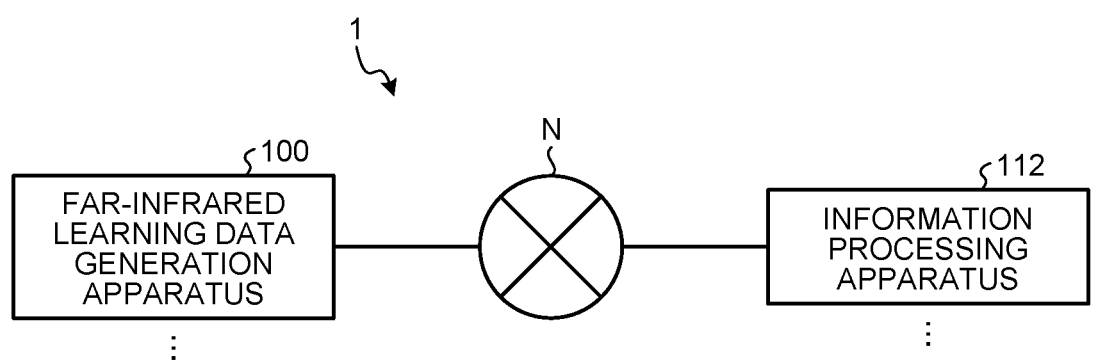
FIG. 1 is a diagram illustrating a configuration example of a learning system according to an embodiment of the present disclosure.

Hereinafter, embodiments of the present disclosure will be described in detail with reference to the drawings. Note that the infrared information display apparatus, the infrared information display method, the learning data generation apparatus, and the learning system according to the present application are not limited by the embodiment. In each of the following embodiments, the same parts are denoted by the same reference numerals, and redundant description will be omitted.

The present disclosure will be described according to the following order of items.

Figure 2:
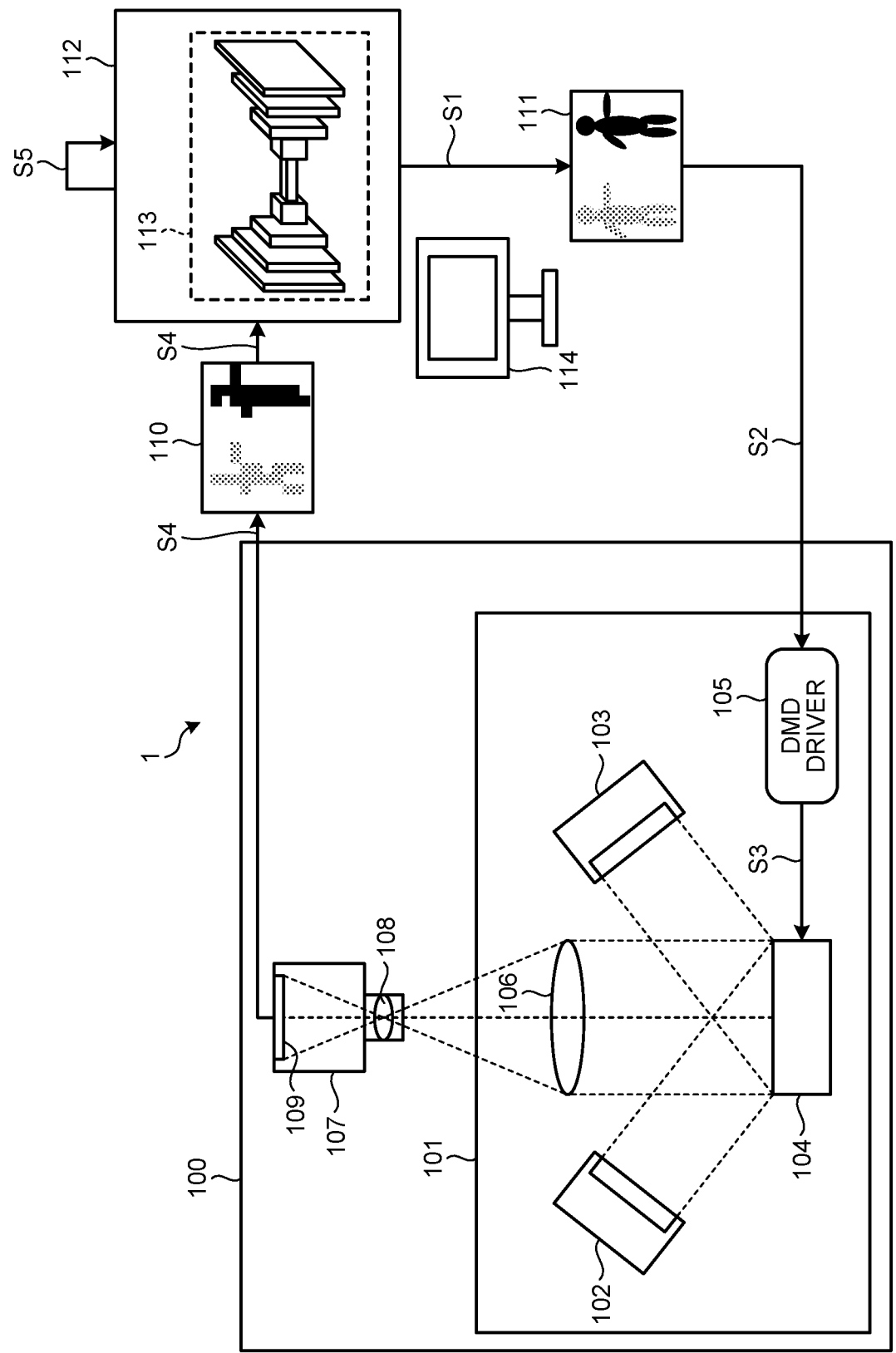
FIG. 2 is a diagram illustrating an example of learning processing according to an embodiment of the present disclosure.

1. Embodiment
 1-1. Configuration of learning system according to embodiment
 1-2. Overview of learning processing according to embodiment of present disclosure
 1-3. Procedure of data generation processing according to embodiment
2. Other Embodiments
 2-1. Others
3. Effects according to present disclosure
4. Hardware configuration 1. Embodiment 1-1. Configuration of Learning System According to Embodiment First, a learning system 1 illustrated in FIGS. 1 and 2 will be described. FIG. 1 is a diagram illustrating a configuration example of a learning system according to an embodiment of the present disclosure. FIG. 2 is a diagram illustrating an example of learning processing according to the embodiment of the present disclosure. As illustrated in FIG. 1, the learning system 1 includes a far-infrared learning data generation apparatus 100 and an information processing apparatus 112. For example, the far-infrared learning data generation apparatus 100 and the information processing apparatus 112 may be directly coupled by wire, or may be communicably coupled by wire or wirelessly via a communication network (network N). Note that the learning system 1 illustrated in FIGS. 1 and 2 may include a plurality of far-infrared learning data generation apparatuses 100 and a plurality of information processing apparatuses 112.

Configuration Description of Far-Infrared Learning Data Generation Apparatus

The far-infrared learning data generation apparatus 100 in FIG. 2 is a learning data generation apparatus that generates data used for learning related to infrared rays. The far-infrared learning data generation apparatus 100 includes a far-infrared image display apparatus 101 and a far-infrared camera 107.

The far-infrared image display apparatus 101 emits, toward the far-infrared camera 107, radiation light corresponding to a presentation image 111 that is a far-infrared image of teaching data input from the information processing apparatus 112. The far-infrared camera 107 generates an observation image 110 by observing the radiation light emitted from the far-infrared image display apparatus 101.

Configuration Description of Far-Infrared Image Display Apparatus

The far-infrared image display apparatus 101 includes a black-body furnace 102, a black-body furnace 103, a DMD 104, a DMD driver 105, and a lens 106.

Here, the black-body furnace 102 and the black-body furnace 103 are temperature apparatuses in which temperature distribution in a plane is extremely uniform and a set temperature can be reproduced with high accuracy. Further, the temperature set in the black-body furnace 102 is different from the temperature set in the black-body furnace 103. For example, the temperature of the black-body furnace 103 may be set to be lower than the temperature of the black-body furnace 102, or vice versa. In addition, the DMD 104, the black-body furnace 102, and the black-body furnace 103 are disposed at positions where radiation light from either the black-body furnace 102 or the black-body furnace 103 is observed when observed from a specific observation direction. The specific observation direction here is, for example, a direction based on a positional relationship between the far-infrared camera 107 that observes radiation light from the DMD 104 and the DMD 104.

The DMD driver 105 acquires a presentation image 111 of a far-infrared image, which is teaching data, from the information processing apparatus 112. The DMD driver 105 calculates temperature information corresponding to each pixel from luminance information of each pixel of the presentation image 111, and transmits a drive switching control signal for controlling a reflecting mirror of the DMD 104 based on the temperature information. The control is performed by, for example, pulse width modulation (PWM) control. The DMD driver 105 expresses a temperature between the black-body furnace 102 and the black-body furnace 103 by performing the PWM control on the DMD 104 in consideration of weighted addition by a duty ratio.

The DMD 104 receives the drive switching control signal from the DMD driver 105. The DMD 104 reproduces the temperature corresponding to each pixel of the presentation image 111 by switching a direction of each reflecting mirror based on the drive switching control, and emits the radiation light to the far-infrared camera 107.

Specifically, based on the drive switching control signal, the DMD 104 switches the direction of each reflecting mirror to either a direction in which the radiation light from the black-body furnace 102 is observed from a specific observation direction or a direction in which the radiation light from the black-body furnace 103 is observed from a specific observation direction. At this time, each reflecting mirror corresponding to each pixel of the DMD 104 can be switched at a high speed similarly to that disclosed in Non Patent Literature 3, and thus, it is possible to perform gradation display on a presentation video in which the presentation image is disposed in time series as one frame. In a case where the DMD 104 is a DMD capable of switching 10,000 times/second, for example, and displays a video of 30 fps per frame, the direction of the reflecting mirror can be switched 333 times within the time of one frame, and it is possible to express 333 gradations of gray scale. For example, the presentation image 111 is one frame in the video.

Assuming that a frame rate of the image displayed by the DMD 104 is f, one cycle T for displaying the image is T=1/f. A case where the temperature of the black-body furnace 102 is t1, the temperature of the black-body furnace 103 is t2, and the temperature desired to be displayed by a certain pixel x of the presentation image 111 is t (x) will be described below as an example. At this time, a pixel corresponding to the pixel x in the observation image 110 observed by the far-infrared camera 107 is defined as x'. At this time, the relationship between x and x' is expressed by the following Formula (1).

$$x=p(x') \quad (1)$$

Assuming that a ratio of the time for which the pixel of the DMD 104 corresponding to the pixel x reflects light from the black-body furnace 102 during the one cycle T is α (x) and a ratio of the time for which the pixel reflects light from the black-body furnace 103 is (1−α (x)), a temperature $t_c$ (x') of the pixel x' observed by the far-infrared camera 107 is expressed by the following Formula (2).

$$t_c(x')=\alpha(p(x'))t_1+(1-\alpha(p(x')))t_2 \quad (2)$$

The temperature $t_c$ (light corresponding thereto) indicated by Formula (2) is condensed by the lens 106, and light from a mirror corresponding to the pixel on the DMD 104 is condensed on a pixel on which an FPA 109 of the far-infrared camera 107 is located. Note that α (x) satisfies the following Formula (3).

$$0 \leq \alpha(x) \leq 1 \quad (3)$$

By determining α (x) such that t (x)=$t_c$ (x'), the DMD 104 can display the temperature to be calculated for each pixel. Here, a relationship between mirror switching of the DMD 104 and α (x) will be described. A maximum number of times that the mirror of the DMD 104 can switch between a first direction and a second direction different from the first direction during the time T (one cycle T) is defined as n. In this case, the time $t_1$ during which the mirror of the DMD 104 is oriented in the first direction can be represented by following Formula (4), and the time $t_2$ during which the mirror of the DMD 104 is oriented in the second direction can be represented by following Formula (5).

$$t_1=n\alpha(x) \quad (4)$$

$$t_2=n(1-\alpha(x)) \quad (5)$$

In order to minimize flicker when observed by the far-infrared camera 107, the DMD 104 may be switched as many times as possible within a range where the Formulas (4) and (5) are satisfied, and may be switched such that the distribution in the time direction in which the switching occurs is as uniform as possible. For this reason, the DMD driver 105 executes the drive switching control of the DMD 104 such that the number of switching is large (for example, maximum) and the distribution in the time direction of switching becomes uniform within the range where the Formulas (4) and (5) are satisfied.

As a result, the temperature corresponding to each pixel of the presentation image 111 is reproduced by using a temperature range of the temperature of the black-body furnace 102 and the temperature of the black-body furnace 103. Note that since the details of the configuration of the DMD 104 are similar to those disclosed in Non Patent Literature 3, the description thereof is omitted.

The lens 106 is an optical element disposed between the DMD 104 and the far-infrared camera 107. Note that the shape of the lens 106 is not limited to the shape illustrated in FIG. 2, and may be any shape.

Configuration Description of Far-Infrared Camera

The far-infrared camera 107 includes a lens 108 and a focal plane array (FPA) 109. The far-infrared camera 107 observes radiation light from the far-infrared image display apparatus 101 and generates the observation image 110 corresponding to the presentation image 111. The lens 108 is an optical element disposed between the far-infrared image display apparatus 101 and the FPA 109. In the example of FIG. 2, the lens 108 is disposed with an optical axis aligned with the lens 106. Note that the shape of the lens 108 is not limited to the shape illustrated in FIG. 2, and may be any shape. The FPA 109 is a so-called multi-element sensor and is a two-dimensional sensor. The far-infrared camera 107 is not limited to the FPA 109, and may have any sensor (imaging element or the like) as long as a desired observation image can be generated.

Note that, in the example of FIG. 2, a case where the DMD 104, the lens 106, the lens 108, and the FPA 109 are disposed with their centers aligned is illustrated.

Configuration Description of Information Processing Apparatus

Figure 3:
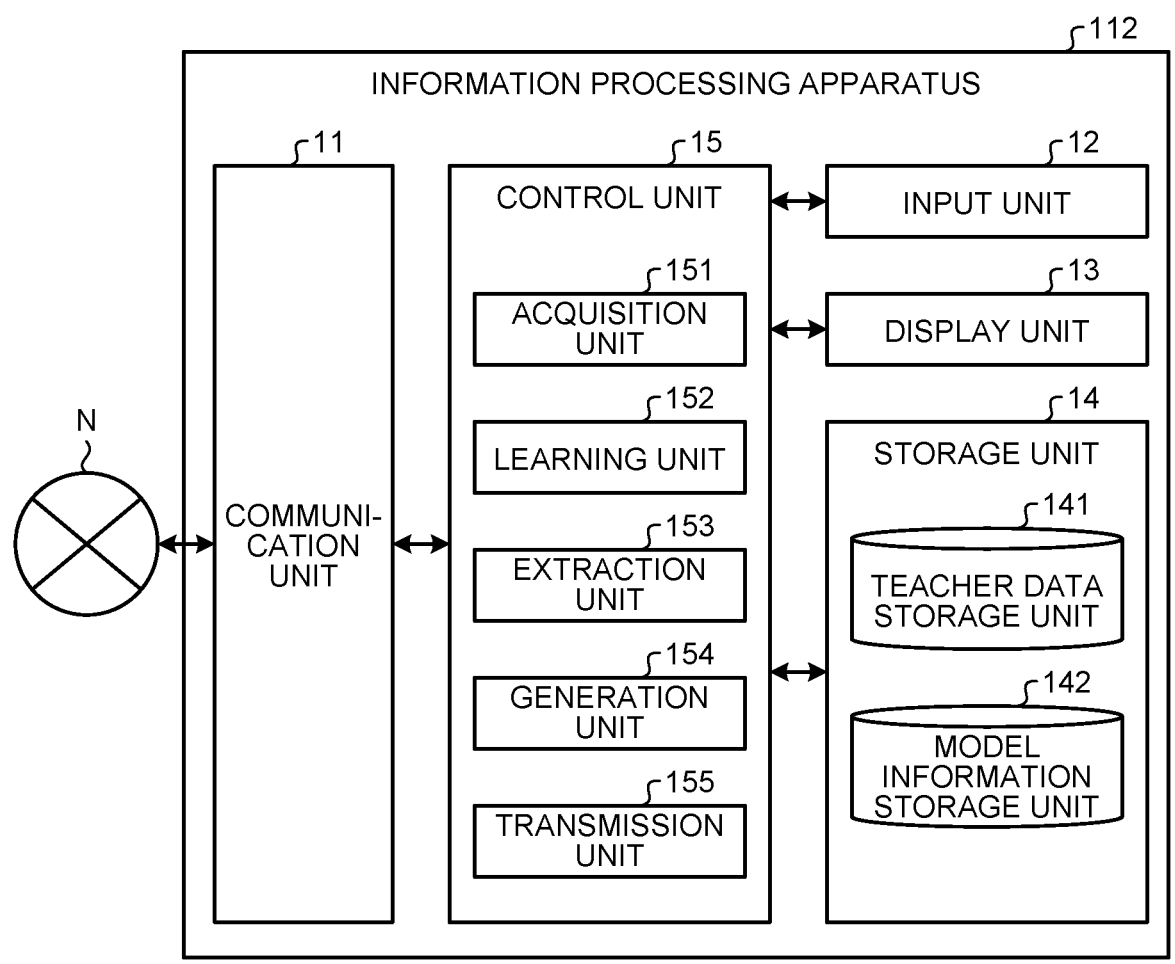
FIG. 3 is a diagram illustrating a configuration example of an information processing apparatus according to an embodiment of a present disclosure.

The information processing apparatus 112 is an information processing apparatus that executes information processing according to the embodiment. The information processing apparatus 112 is a terminal apparatus used by a user such as an administrator of the learning system 1. For example, the information processing apparatus 112 may be various apparatuses used by the user, such as a smartphone, a tablet terminal, a smart speaker, a notebook personal computer (PC), a desktop PC, a mobile phone, and a personal digital assistant (PDA). Hereinafter, a configuration of the information processing apparatus 112 will be described with reference to FIG. 3. FIG. 3 is a diagram illustrating a configuration example of the information processing apparatus according to the embodiment of the present disclosure.

As illustrated in FIG. 3, the information processing apparatus 112 includes a communication unit 11, an input unit 12, a display unit 13, a storage unit 14, and a control unit 15. In the example of FIG. 3, the information processing apparatus 112 includes an input unit 12 (for example, a keyboard, a mouse, or the like) that receives various operations from the administrator or the like of the information processing apparatus 112, and a display unit 13 (for example, a liquid crystal display or the like) for displaying various types of information.

The communication unit 11 is achieved by, for example, a network interface card (NIC) or the like. The communication unit 11 is coupled to a network N (the Internet or the like) in a wired or wireless manner, and transmits and receives information to and from other apparatuses such as the far-infrared learning data generation apparatus 100 via the network N.

The input unit 12 receives an input such as selection of a learning method by the user. The input unit 12 may receive an input via a keyboard, a mouse, or a touch panel provided in the information processing apparatus 112.

The display unit 13 is a display apparatus (display unit) such as a display, and displays various types of information such as information generated by a generation unit 154. The display unit 13 may be a display 114 in FIG. 2, and in this case, the display unit 13 may be a separate body from the information processing apparatus 112.

Furthermore, the information processing apparatus 112 is not limited to the display unit 13, and may have a functional configuration that outputs information. The information processing apparatus 112 may include a sound output unit such as a speaker that outputs information as a sound.

The storage unit 14 is achieved by, for example, a semiconductor memory element such as a random access memory (RAM) and a flash memory, or a storage apparatus such as a hard disk and an optical disk. The storage unit 14 includes a teacher data storage unit 141 and a model information storage unit 142. Note that the storage unit 14 is not limited to the above, and stores various types of information, for example, a presentation image list including a plurality of presentation images.

The teacher data storage unit 141 stores various types of information related to data used for learning. The teacher data storage unit 141 stores a teacher data list used for learning. The teacher data storage unit 141 stores, as the teacher data, a combination (set) in which the observation image 110 is used as input data and the presentation image 111 corresponding to the observation image 110 is used as correct answer information.

Note that the teacher data storage unit 141 is not limited to the above, and may store various types of information according to the purpose.

The model information storage unit 142 stores information related to the model. For example, the model information storage unit 142 stores information (model data) indicating a structure of the model (network). For example, the model information storage unit 142 includes items such as "model ID", "use", and "model data".

The "model ID" indicates identification information for identifying the model. The "use" indicates the use of the corresponding model. The "model data" indicates data on the model. The "model data" includes various types of information configuring the model, such as information related to a network and a function included in the model.

The model information storage unit 142 stores the neural network 113 in association with a model ID "M1". In addition, the model information storage unit 142 stores the use of the neural network 113 and the model data. The model information storage unit 142 may store a plurality of models. The model information storage unit 142 may store various models (networks) in addition to the neural network 113.

Note that the model information storage unit 142 is not limited to the above, and may store various types of information depending on the purpose.

The control unit 15 is achieved by, for example, a central processing unit (CPU), a micro processing unit (MPU), or the like executing a program (for example, an information processing program according to the present disclosure) stored inside the information processing apparatus 112 by using a RAM or the like as a work area. Furthermore, the control unit 15 may be achieved by, for example, an integrated circuit such as an application specific integrated circuit (ASIC) and a field programmable gate array (FPGA).

As illustrated in FIG. 3, the control unit 15 includes an acquisition unit 151, a learning unit 152, an extraction unit 153, the generation unit 154, and a transmission unit 155, and achieves or executes a function and an action of information processing described below. Note that an internal configuration of the control unit 15 is not limited to the configuration illustrated in FIG. 3, and may be another configuration as long as information processing to be described later is performed.

The acquisition unit 151 acquires various types of information from the storage unit 14. The acquisition unit 151 acquires information received by the input unit 12.

The acquisition unit 151 acquires an observation image observed by the far-infrared learning data generation apparatus 100. The acquisition unit 151 stores the acquired observation image in the teacher data storage unit 141 as learning data (teacher data).

When a low-resolution image is input, the learning unit 152 learns the model so as to output a high-resolution image corresponding to the input image. The learning unit 152 learns parameters of the neural network 113 and generates the neural network 113.

The learning unit 152 learns the neural network 113 by using the teacher data stored in the teacher data storage unit 141. The learning unit 152 stores the learned neural network 113 in the model information storage unit 142.

For example, in a case where the observation image 110 that is a deterioration image affected by characteristics of the lens 106, the lens 108, the far-infrared camera 107, and the like is input, the learning unit 152 learns the parameters of the neural network 113 so as to output the presentation image 111 corresponding to the observation image 110. The learning unit 152 generates the neural network 113 which is a deep neural network (DNN) such as a convolutional neural network (CNN).

The extraction unit 153 extracts a presentation image from a presentation image list stored in the storage unit 14.

The generation unit 154 generates teacher data associated with the observation image and the presentation image corresponding to the observation image. The generation unit 154 stores the generated teacher data in the teacher data storage unit 141.

The transmission unit 155 transmits various types of information to an external information processing apparatus. The transmission unit 155 transmits the information stored in the storage unit 14. The transmission unit 155 transmits the presentation image extracted by the extraction unit 153 to the far-infrared learning data generation apparatus 100.

1-2. Overview of Learning Processing According to Embodiment of Present Disclosure The learning processing illustrated in FIG. 2 will be described below. The learning processing according to the embodiment of the present disclosure is achieved by the learning system 1. Note that the presentation image 111 in FIG. 2 is a so-called monochrome image. The presentation image 111 is an image in which a temperature is converted into a luminance value. For example, the presentation image 111 becomes closer to white as the temperature is higher, and becomes closer to black as the temperature is lower.

First, the information processing apparatus 112 determines the presentation image 111 to be input to the far-infrared infrared learning data generation apparatus 100, and extracts the presentation image 111 from the presentation image list (step S1).

The information processing apparatus 112 inputs the presentation image 111 to the far-infrared learning data generation apparatus 100 (step S2). Specifically, the information processing apparatus 112 inputs the presentation image 111 to the DMD driver 105.

The DMD driver 105 expresses the temperature corresponding to the input presentation image 111 by controlling the DMD 104 for each pixel of the presentation image 111 (step S3).

The far-infrared learning data generation apparatus 100 observes the image displayed by the far-infrared image display apparatus 101 by the far-infrared camera 107, obtains the observation image 110, and outputs the observation image 110 to the information processing apparatus 112 (step S4).

Then, the information processing apparatus 112 performs the learning processing by giving the observation image 110 and the presentation image 111 to the neural network 113 as the learning data (step S5). The neural network 113 is a model (network) that receives an image as input and outputs (generates) an image corresponding to the image. For example, the information processing apparatus 112 inputs the observation image 110 to the neural network 113 as learning data, and the neural network 113 performs learning processing by using the presentation image 111 as teaching data. For example, the information processing apparatus 112 performs the learning processing by using the method disclosed in Non Patent Literature 1. As a result, the information processing apparatus 112 can generate the neural network 113 that receives an infrared image as an input and outputs an infrared image obtained by improving an image quality of the infrared image.

As described above, the information processing apparatus 112 can achieve processing such as high-resolution image restoration of the far-infrared camera by giving the observation image 110 as learning data and the presentation image 111 as teaching data to the neural network 113. In addition, light observed by the far-infrared camera 107 is restricted by either the black-body furnace 102 or the black-body furnace 103, and it is possible to suppress the influence of the temperature of other places, for example, a housing (of the far-infrared image display apparatus 101) and the like, so that the light is hardly affected by the disturbance. In other words, the far-infrared image display apparatus 101 can narrow the room for the influence of the environmental temperature and the disturbance as compared with the case where there is one black-body furnace.

As a result, the far-infrared learning data generation apparatus 100 can generate learning data with less influence of environmental temperature and disturbance than in a case where there is one black-body furnace, and can suppress a decrease in an accuracy of learning related to an infrared image.

1-3. Procedure of Data Generation Processing According to Embodiment

Figure 4:
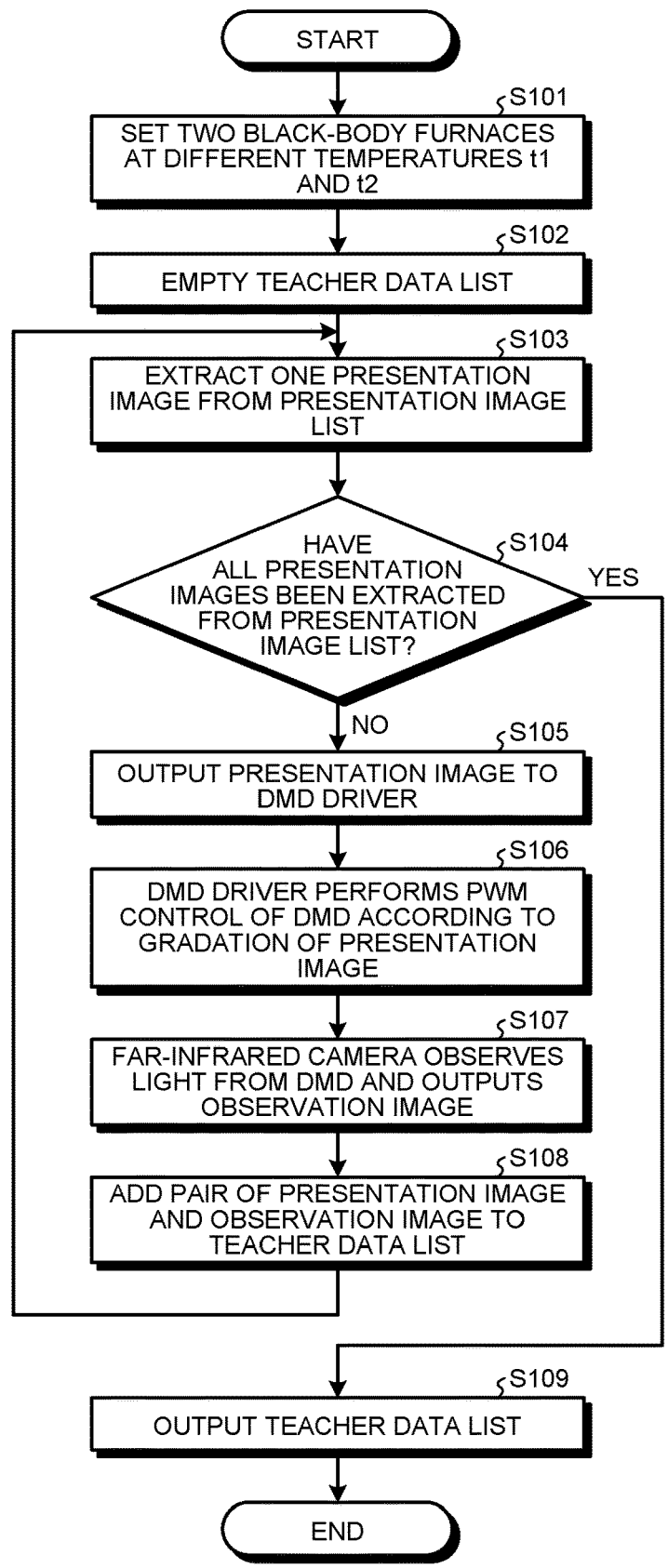
FIG. 4 is a flowchart illustrating a procedure of learning data generation processing according to an embodiment of a present disclosure.

Next, a procedure of data generation processing according to the embodiment will be described with reference to FIG. 4. FIG. 4 is a flowchart illustrating a procedure of learning data generation processing according to the embodiment of the present disclosure.

As illustrated in FIG. 4, the far-infrared image display apparatus 101 of the far-infrared learning data generation apparatus 100 sets the two black-body furnaces at different temperatures t1 and t2 (step S101). For example, the far-infrared image display apparatus 101 sets the black-body furnace 102 at a temperature t1 and sets the black-body furnace 103 at a temperature t2. Since the temperature that can be presented is between the temperature t1 that is the temperature of the black-body furnace 102 and the temperature t2 that is the temperature of the black-body furnace 103, the far-infrared image display apparatus 101 determines the temperatures t1 and t2 from the range of temperatures desired to be displayed.

Then, the information processing apparatus 112 empties the teacher data list for result output (step S102).

Then, the information processing apparatus 112 extracts one presentation image from the presentation image list (step S103).

When not all the presentation images have been extracted from the presentation image list (step S104: No), the information processing apparatus 112 outputs the presentation image to the DMD driver 105 (step S105). For example, the information processing apparatus 112 transmits a presentation image representing a temperature by gradation of each pixel to the DMD driver 105.

The DMD driver 105 of the far-infrared image display apparatus 101 performs PWM control of the DMD 104 according to the gradation of the input presentation image (step S106).

The far-infrared camera 107 observes light from the DMD 104 and outputs an observation image (step S107).

The information processing apparatus 112 adds the obtained observation image and the presentation image to the teacher data list (step S108).

In a case where all the presentation images have already been extracted from the presentation image list (step S104: Yes), the information processing apparatus 112 outputs the teacher data and ends the process (step S109).

The information processing apparatus 112 can construct a network that outputs an ideal image from the camera image by learning a network (the neural network 113 or the like) such as a CNN by using the generated teacher data list.

2. Other Embodiments

The processing according to each embodiment described above may be executed in various different forms (modifications) other than each embodiment described above. For example, the system configuration is not limited to the above-described example, and may be various modes. For example, the information processing apparatus 112 and the far-infrared learning data generation apparatus 100 may be integrated. Note that the above is an example, and the learning system may be achieved by various configurations.

2-1. Others

In addition, among each of the processing described in the above embodiment, all or a part of the processing described as being automatically performed can be manually performed, or all or a part of the processing described as being manually performed can be automatically performed by a known method. In addition, the processing procedure, specific name, and various types of information including data and parameters indicated in the specification and the drawings can be arbitrarily changed unless otherwise specified. For example, the various types of information indicated in each drawing are not limited to the illustrated information.

In addition, each component of each apparatus illustrated in the drawings is functionally conceptual, and is not necessarily physically configured as illustrated in the drawings. That is, a specific form of distribution and integration of each apparatus is not limited to the illustrated form, and all or a part thereof can be functionally or physically distributed and integrated in an arbitrary unit according to various loads, usage conditions, and the like.

In addition, above-described each embodiment and modification can be appropriately combined within a range that does not contradict processing contents.

Furthermore, the effects described in the present specification are merely examples and are not limited, and other effects may be provided.

3. Effects According to Present Disclosure

As described above, the infrared information display apparatus (the far-infrared image display apparatus 101 in the embodiment) according to the present disclosure includes a first black-body furnace (the black-body furnace 102 in the embodiment), a second black-body furnace (the black-body furnace 103 in the embodiment) having a temperature different from that of the first black-body furnace, a drive control unit (the DMD driver 105 in the embodiment), and a reflecting section (the DMD 104 in the embodiment). The drive control unit performs drive switching control for reflecting the temperature corresponding to the temperature information by switching the radiation light reflected by the reflecting mirror from the radiation light of the first black-body furnace to the radiation light of the second black-body furnace based on the input temperature information of the far-infrared image. The reflecting section has a plurality of two-dimensionally disposed reflecting mirrors corresponding to each pixel of the far-infrared image and whose direction is changed by the drive switching control.

As a result, the infrared information display apparatus according to the present disclosure can reflect the radiation light of either of the two black-body furnaces of which temperatures are defined by switching the radiation light reflected by the plurality of reflecting mirrors in the two black-body furnaces having different temperatures, and can narrow a room for influence of environmental temperature and disturbance as compared with a case where there is one black-body furnace. In addition, since the temperature of each black-body furnace is controlled with very high accuracy, the infrared information display apparatus can display a far-infrared image with high accuracy by displaying light obtained by combining only reflected light from the black-body furnace. As a result, the infrared information display apparatus can generate appropriate learning data by an observation apparatus such as a far-infrared camera that observes radiation light from the infrared information display apparatus. Then, in a case where learning is performed by using the learning data, accurate learning can be performed. Therefore, the infrared information display apparatus can suppress a decrease in an accuracy of learning related to the infrared image.

In addition, the disposition relationship among the reflecting section, the first black-body furnace, and the second black-body furnace is a disposition in which the radiation light from either the first black-body furnace or the second black-body furnace is observed according to the drive switching control when observed from a specific observation direction based on the positional relationship between the far-infrared camera that observes the radiation light from the reflecting section and the reflecting section. As a result, the infrared information display apparatus is disposed such that the radiation light of either of the two black-body furnaces is observed from a specific observation direction based on the positional relationship between the far-infrared camera and the reflecting section, and thus, it is possible to narrow the room for the influence of the environmental temperature and the disturbance as compared with a case where there is one black-body furnace. Therefore, the infrared information display apparatus can suppress a decrease in an accuracy of learning related to the infrared image.

In addition, the reflecting section displays a temperature between a first temperature of the first black-body furnace and a second temperature of the second black-body furnace by the drive switching control. As a result, since the infrared information display apparatus can display the temperature between the first temperature and the second temperature by using the two black-body furnaces, that is the first black-body furnace and the second black-body furnace, it is possible to narrow the room for the influence of the environmental temperature and the disturbance as compared with a case where there is only one black-body furnace. Therefore, the infrared information display apparatus can suppress a decrease in an accuracy of learning related to the infrared image.

In addition, the drive control unit performs drive switching control for switching the directions of the plurality of reflecting mirrors in either a first direction in which the radiation light from the first black-body furnace is observed from a specific observation direction or a second direction in which the radiation light from the second black-body furnace is observed from a specific observation direction. As a result, the infrared information display apparatus controls the direction of the reflecting mirror such that the radiation light of either the first black-body furnace or the second black-body furnace is observed, so that it is possible to narrow the room for the influence of the environmental temperature and the disturbance as compared with the case where there is one black-body furnace. Therefore, the infrared information display apparatus can suppress a decrease in an accuracy of learning related to the infrared image.

In addition, the learning data generation apparatus (the far-infrared learning data generation apparatus 100 in the embodiment) according to the present disclosure includes an infrared information display apparatus and a far-infrared camera. In the infrared information display apparatus, a first black-body furnace and a second black-body furnace having a temperature different from that of the first black-body furnace are two-dimensionally disposed, and based on input temperature information of the far-infrared image, the temperature corresponding to the temperature information is reflected by switching the radiation light reflected by the plurality of reflecting mirrors corresponding to each pixel of the far-infrared image. The far-infrared camera observes the radiation light from the infrared information display apparatus and generates an observation image.

As a result, the learning data generation apparatus according to the present disclosure observes the radiation light reflected by the plurality of reflecting mirrors in the two black-body furnaces having different temperatures and generates the observation image, so that it is possible to generate learning data with less influence of environmental temperature and disturbance than in a case where there is one black-body furnace. Then, in a case where learning is performed by using the learning data, accurate learning can be performed. Therefore, the learning data generation apparatus can suppress a decrease in an accuracy of learning related to the infrared image.

Furthermore, the learning system (the learning system 1 in the embodiment) according to the present disclosure includes an infrared information display apparatus, a far-infrared camera, and an information processing apparatus. In the infrared information display apparatus, a first black-body furnace and a second black-body furnace having a temperature different from that of the first black-body furnace are two-dimensionally disposed, and based on input temperature information of the far-infrared image, the temperature corresponding to the temperature information is reflected by switching the radiation light reflected by the plurality of reflecting mirrors corresponding to each pixel of the far-infrared image. The far-infrared camera observes the radiation light from the infrared information display apparatus and generates the observation image. The information processing apparatus performs machine learning using a combination of the far-infrared image and the observation image.

As a result, the learning system according to the present disclosure performs the machine learning by using the observation image generated by observing the radiation light reflected by the plurality of reflecting mirrors in the two black-body furnaces having different temperatures and the far-infrared image that is the basis of the observation image, so that the machine learning can be performed by using the data less affected by the environmental temperature and the disturbance than in the case where there is one black-body furnace. As a result, the learning system can perform accurate learning. Therefore, the learning system can suppress a decrease in an accuracy of learning related to the infrared image.

4. Hardware Configuration

Figure 5:
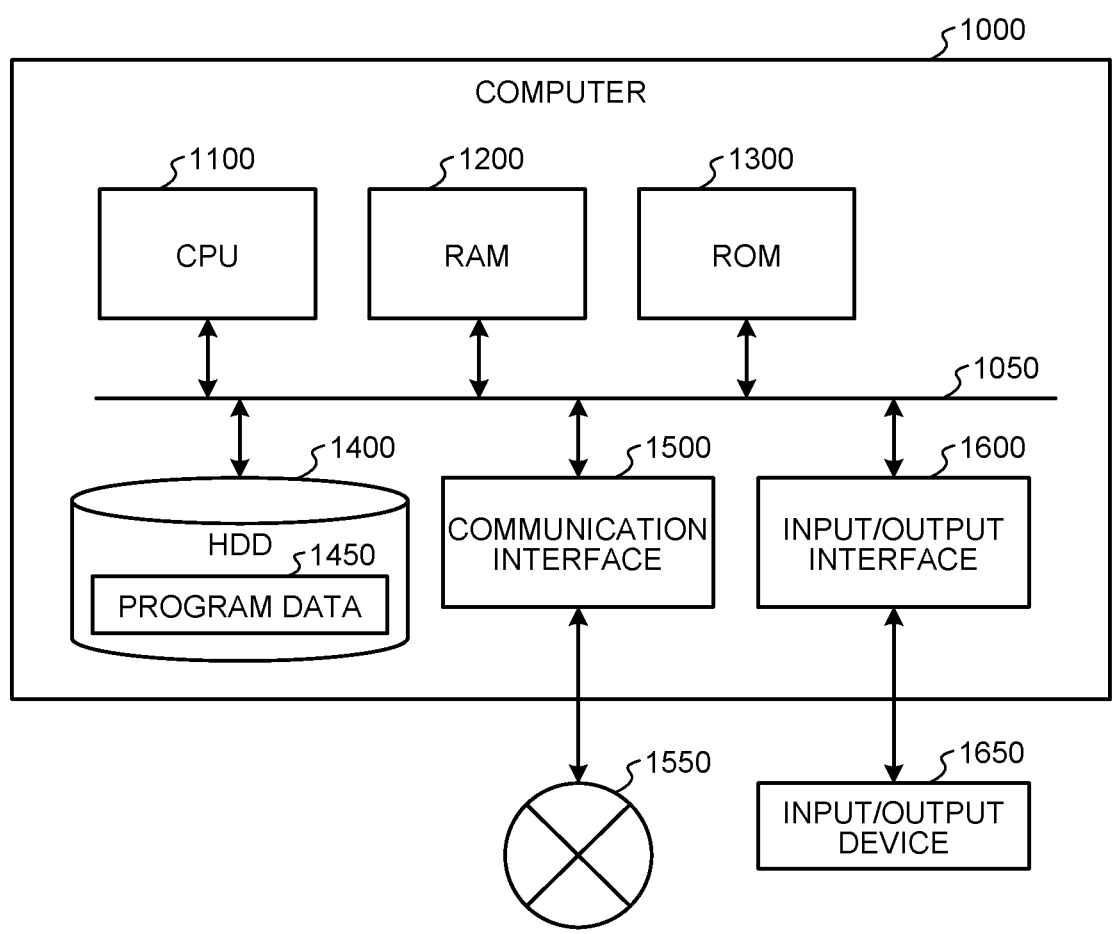
FIG. 5 is a hardware configuration diagram illustrating an example of a computer that achieves functions of an information device.

An information device such as the information processing apparatus 112 according to each embodiment described above is achieved by, for example, a computer 1000 having a configuration as illustrated in FIG. 5. FIG. 5 is a hardware configuration diagram illustrating an example of a computer that achieves the functions of an information device. Hereinafter, the information processing apparatus 112 according to the embodiment will be described as an example. The computer 1000 includes a CPU 1100, a RAM 1200, a read only memory (ROM) 1300, a hard disk drive (HDD) 1400, a communication interface 1500, and an input/output interface 1600. Each unit of the computer 1000 is coupled by a bus 1050.

The CPU 1100 operates based on a program stored in the ROM 1300 or the HDD 1400, and controls each unit. For example, the CPU 1100 develops a program stored in the ROM 1300 or the HDD 1400 in the RAM 1200, and executes processing corresponding to various programs.

The ROM 1300 stores a boot program such as a basic input output system (BIOS) executed by the CPU 1100 when the computer 1000 is activated, a program that depends on hardware of the computer 1000, and the like.

The HDD 1400 is a computer-readable recording medium that non-transiently records a program executed by the CPU 1100, data used by the program, and the like. Specifically, the HDD 1400 is a recording medium that records an information processing program according to the present disclosure as an example of the program data 1450.

The communication interface 1500 is an interface for the computer 1000 to couple to an external network 1550 (for example, the Internet). For example, the CPU 1100 receives data from another device or transmits data generated by the CPU 1100 to another device via the communication interface 1500.

The input/output interface 1600 is an interface for coupling an input/output device 1650 to the computer 1000. For example, the CPU 1100 receives data from an input device such as a keyboard and a mouse via the input/output interface 1600. In addition, the CPU 1100 transmits data to an output device such as a display, a speaker, and a printer via the input/output interface 1600. Furthermore, the input/output interface 1600 may function as a media interface that reads a program or the like recorded in a predetermined recording medium (medium). The medium is, for example, an optical recording medium such as a digital versatile disc (DVD) and a phase change rewritable disk (PD), a magneto-optical recording medium such as a magneto-optical disk (MO), a tape medium, a magnetic recording medium, a semiconductor memory, and the like.

For example, in a case where the computer 1000 functions as the information processing apparatus 112 according to the embodiment, the CPU 1100 of the computer 1000 achieves the functions of the control unit 15 and the like by executing the information processing program loaded on the RAM 1200. In addition, the HDD 1400 stores an information processing program according to the present disclosure and data in the storage unit 14. Note that the CPU 1100 reads the program data 1450 from the HDD 1400 and executes the program data, but as another example, these programs may be acquired from another apparatus via the external network 1550.

Note that the present technique can also have the following configurations.

(1)
An infrared information display apparatus comprising:
a first black-body furnace;
a second black-body furnace that has a temperature different from a temperature of the first black-body furnace;
a drive control unit configured to perform drive switching control of reflecting a temperature corresponding to input temperature information of a far-infrared image by switching radiation light reflected by a reflecting mirror from radiation light of the first black-body furnace to radiation light of the second black-body furnace based on the temperature information; and
a reflecting section that has a plurality of two-dimensionally disposed reflecting mirrors corresponding to each pixel of the far-infrared image and of which a direction is changed by the drive switching control.

(2)
The infrared information display apparatus according to (1),
wherein a disposition relationship among the reflecting section, the first black-body furnace, and the second black-body furnace is a disposition in which radiation light from either the first black-body furnace or the second black-body furnace is observed according to the drive switching control when observed from a specific observation direction based on a positional relationship between a far-infrared camera that observes the radiation light from the reflecting section and the reflecting section.

(3)
The infrared information display apparatus according to (2),
wherein the reflecting section displays a temperature between a first temperature of the first black-body furnace and a second temperature of the second black-body furnace, by the drive switching control.

(4)
The infrared information display apparatus according to (2),
wherein the drive control unit performs the drive switching control in which directions of the plurality of reflecting mirrors are switched to a first direction in which the radiation light from the first black-body furnace is observed from the specific observation direction or a second direction in which the radiation light from the second black-body furnace is observed from the specific observation direction.

(5)
An infrared information display method comprising:
performing drive switching control of reflecting a temperature corresponding to input temperature information of a far-infrared image by switching radiation light reflected by a reflecting mirror from radiation light of a first black-body furnace to radiation light of a second black-body furnace having a temperature different from a temperature of the first black-body furnace based on the temperature information; and
changing directions of a plurality of reflecting mirrors that are two-dimensionally disposed and correspond to each pixel of the far-infrared image by the drive switching control.

(6)
A learning data generation apparatus comprising:
an infrared information display apparatus in which a first black-body furnace and a second black-body furnace having a temperature different from a temperature of the first black-body furnace are two-dimensionally disposed, and based on input temperature information of a far-infrared image, a temperature corresponding to the temperature information is reflected by switching radiation light reflected by a plurality of reflecting mirrors corresponding to each pixel of the far-infrared image; and
a far-infrared camera that observes the radiation light from the infrared information display apparatus and generates an observation image.

(11)
A learning system comprising:
an infrared information display apparatus in which a first black-body furnace and a second black-body furnace having a temperature different from a temperature of the first black-body furnace are two-dimensionally disposed, and based on input temperature information of a far-infrared image, a temperature corresponding to the temperature information is reflected by switching radiation light reflected by a plurality of reflecting mirrors corresponding to each pixel of the far-infrared image;
a far-infrared camera that observes the radiation light from the infrared information display apparatus and generates an observation image; and
an information processing apparatus that performs machine learning by using a combination of the far-infrared image and the observation image.

REFERENCE SIGNS LIST

1 LEARNING SYSTEM
100 FAR-INFRARED LEARNING DATA GENERATION APPARATUS (LEARNING DATA GENERATION APPARATUS)
101 FAR-INFRARED IMAGE DISPLAY APPARATUS (INFRARED INFORMATION DISPLAY APPARATUS)
102 BLACK-BODY FURNACE (FIRST BLACK-BODY FURNACE)
103 BLACK-BODY FURNACE (SECOND BLACK-BODY FURNACE)
104 DMD (REFLECTING SECTION)
105 DMD DRIVER (DRIVE CONTROL UNIT)
106 LENS
107 FAR-INFRARED CAMERA
108 LENS
109 FPA (IMAGING ELEMENT)
112 INFORMATION PROCESSING APPARATUS
11 COMMUNICATION UNIT
12 INPUT UNIT
13 DISPLAY UNIT (DISPLAY)
14 STORAGE UNIT
141 TEACHER DATA STORAGE UNIT
142 MODEL INFORMATION STORAGE UNIT
15 CONTROL UNIT
151 ACQUISITION UNIT
152 LEARNING UNIT
153 EXTRACTION UNIT
154 GENERATION UNIT
155 TRANSMISSION UNIT

The invention claimed is:
1. An infrared information display apparatus, comprising:
a first black-body furnace;
a second black-body furnace that has a temperature different from a temperature of the first black-body furnace;

a drive control unit configured to perform drive switching control of reflecting a temperature corresponding to input temperature information of a far-infrared image by switching radiation light reflected by a reflecting mirror from radiation light of the first black-body furnace to radiation light of the second black-body furnace based on the temperature information; and a reflecting section that has a plurality of two-dimensionally disposed reflecting mirrors corresponding to each pixel of the far-infrared image and of which a direction is changed by the drive switching control.

2. The infrared information display apparatus according to claim 1, wherein a disposition relationship among the reflecting section, the first black-body furnace, and the second black-body furnace is a disposition in which radiation light from either the first black-body furnace or the second black-body furnace is observed according to the drive switching control when observed from a specific observation direction based on a positional relationship between a far-infrared camera that observes the radiation light from the reflecting section and the reflecting section.

3. The infrared information display apparatus according to claim 2, wherein the reflecting section displays a temperature between a first temperature of the first black-body furnace and a second temperature of the second black-body furnace, by the drive switching control.

4. The infrared information display apparatus according to claim 2, wherein the drive control unit performs the drive switching control in which directions of the plurality of reflecting mirrors are switched to a first direction in which the radiation light from the first black-body furnace is observed from the specific observation direction or a second direction in which the radiation light from the second black-body furnace is observed from the specific observation direction.

5. An infrared information display method comprising:

performing drive switching control of reflecting a temperature corresponding to input temperature information of a far-infrared image by switching radiation light reflected by a reflecting mirror from radiation light of a first black-body furnace to radiation light of a second black-body furnace having a temperature different from a temperature of the first black-body furnace based on the temperature information; and changing directions of a plurality of reflecting mirrors that are two-dimensionally disposed and correspond to each pixel of the far-infrared image by the drive switching control.

6. A learning data generation apparatus, comprising:

an infrared information display apparatus in which a first black-body furnace and a second black-body furnace having a temperature different from a temperature of the first black-body furnace are two-dimensionally disposed, and based on input temperature information of a far-infrared image, a temperature corresponding to the temperature information is reflected by switching radiation light reflected by a plurality of reflecting mirrors corresponding to each pixel of the far-infrared image; and a far-infrared camera that observes the radiation light from the infrared information display apparatus and generates an observation image.

7. A learning system, comprising:

an infrared information display apparatus in which a first black-body furnace and a second black-body furnace having a temperature different from a temperature of the first black-body furnace are two-dimensionally disposed, and based on input temperature information of a far-infrared image, a temperature corresponding to the temperature information is reflected by switching radiation light reflected by a plurality of reflecting mirrors corresponding to each pixel of the far-infrared image;

a far-infrared camera that observes the radiation light from the infrared information display apparatus and generates an observation image; and an information processing apparatus that performs machine learning by using a combination of the far-infrared image and the observation image.

* * * * *